(12) United States Patent
Yoshioka et al.

(10) Patent No.: US 8,867,910 B2
(45) Date of Patent: Oct. 21, 2014

(54) STROBE DEVICE AND IMAGE PICKUP DEVICE

(75) Inventors: Hiroyuki Yoshioka, Osaka (JP); Takuma Kikuchi, Osaka (JP); Hiroki Kishida, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/882,243

(22) PCT Filed: Dec. 12, 2011

(86) PCT No.: PCT/JP2011/006915
§ 371 (c)(1),
(2), (4) Date: Apr. 29, 2013

(87) PCT Pub. No.: WO2012/081218
PCT Pub. Date: Jun. 21, 2012

(65) Prior Publication Data
US 2013/0222682 A1    Aug. 29, 2013

(30) Foreign Application Priority Data
Dec. 17, 2010    (JP) .................................. 2010-281607

(51) Int. Cl.
*G03B 15/03*    (2006.01)
*G03B 15/05*    (2006.01)
*H01J 1/88*    (2006.01)
*H04N 5/225*    (2006.01)

(52) U.S. Cl.
CPC . *H01J 1/88* (2013.01); *G03B 15/05* (2013.01); *G03B 2215/0578* (2013.01); *H04N 5/2256* (2013.01); *G03B 2215/0582* (2013.01)
USPC ........................................................ 396/155

(58) Field of Classification Search
CPC ... H01J 61/544; H01J 61/547; H01J 61/0735; H01J 61/0672; H01J 61/025; G03B 15/03; G03B 15/05
USPC ............................................ 396/155; 313/234
See application file for complete search history.

(56) References Cited

U.S. PATENT DOCUMENTS 2,919,369 A * 12/1959 Edgerton ....................... 313/570
3,283,202 A * 11/1966 Pennington ..................... 315/46
4,065,370 A * 12/1977 Noble et al. ................... 427/526

(Continued)

FOREIGN PATENT DOCUMENTS

JP    60-141065 U    9/1985
JP    10-115855 A    5/1998
JP    2003-288861 A    10/2003

OTHER PUBLICATIONS

International Search Report for Application No. PCT/JP2011/006915 dated Mar. 13, 2012.

*Primary Examiner* — Rodney Fuller
(74) *Attorney, Agent, or Firm* — RatnerPrestia

(57) ABSTRACT

A strobe device of the present invention includes a reflector having an opening on the subject side, a cylindrical flashtube disposed in the reflector, and a first trigger electrode disposed on the outer peripheral surface of the flashtube. The first trigger electrode is disposed on the subject side of the outer peripheral surface of the flashtube. Thus, a flash of light emitted from the flashtube is reflected in a large range, from the bottom side to the opening side of the reflector, and a strobe device having a large range of light distribution can be achieved.

13 Claims, 7 Drawing Sheets

(56) References Cited

U.S. PATENT DOCUMENTS

| | | | |
|---|---|---|---|
| 4,304,479 A * | 12/1981 | Van Allen | 396/200 |
| 4,342,940 A * | 8/1982 | Mrusko et al. | 313/594 |
| 4,404,618 A * | 9/1983 | Yamada et al. | 362/17 |
| 4,499,406 A * | 2/1985 | Saburo | 315/57 |
| 6,008,583 A * | 12/1999 | Breuer et al. | 313/594 |
| 6,445,885 B2 * | 9/2002 | Nakanishi et al. | 396/176 |
| 6,480,679 B1 * | 11/2002 | Ishida et al. | 396/164 |
| 6,531,832 B1 * | 3/2003 | Hirata et al. | 315/241 P |
| 6,867,547 B2 * | 3/2005 | Dunisch | 313/594 |
| 6,946,794 B2 * | 9/2005 | Yamamoto | 313/607 |
| 7,215,080 B2 * | 5/2007 | Minamoto et al. | 313/607 |
| 2002/0039490 A1 * | 4/2002 | Hagiuda et al. | 396/155 |
| 2004/0057715 A1 * | 3/2004 | Tsuchida et al. | 396/155 |
| 2004/0114917 A1 * | 6/2004 | Saiki et al. | 396/155 |
| 2008/0239247 A1 * | 10/2008 | Yamauchi | 353/81 |

* cited by examiner

STROBE DEVICE AND IMAGE PICKUP DEVICE

THIS APPLICATION IS A U.S. NATIONAL PHASE APPLICATION OF PCT INTERNATIONAL APPLICATION PCT/JP2011/006915.

TECHNICAL FIELD

The present invention relates to a strobe device including a trigger electrode on the outer peripheral surface of a flashtube that is disposed along a reflector, and relates to an image pickup device mounted with the strobe device.

BACKGROUND ART

A strobe device for providing a sufficient light quantity to a subject is mounted in a built-in state or separate state in a recent image pickup device such as a digital still camera.

The mounted strobe device includes a driver circuit and a flashtube having at least a trigger electrode, and instantaneously causes the flashtube to emit light in response to the voltage applied from the driver circuit to the trigger electrode.

The configuration and operation of a typical strobe device are described hereinafter with reference to FIG. 4. FIG. 4 is a diagram showing the configuration of the driver circuit for driving the flashtube of the strobe device.

As shown in FIG. 4, the driver circuit includes storage element 3 such as a capacitor, boost converter circuit 5, control section 6, trigger circuit 7, and switch circuit 8. They are in parallel with battery power supply 4. Light is emitted by applying voltage from trigger circuit 7 to trigger electrode 2 that is formed of a transparent conductive film or the like and disposed on the outer peripheral surface of flashtube 100. Battery power supply 4 supplies electric power to storage element 3. Boost converter circuit 5 increases the voltage of battery power supply 4, and control section 6 controls the whole strobe device. Trigger circuit 7 applies voltage to trigger electrode 2 with a timing of light emission of flashtube 100. Switch circuit 8 controls the emission time of flashtube 100 in response to the light emission quantity required for photographing.

In the strobe device having this configuration, when trigger circuit 7 of the driver circuit instantaneously applies voltage to trigger electrode 2 of flashtube 100, electric power stored in storage element 3 is consumed and flashtube 100 flashes and emits light. A flash of light emitted from flashtube 100 is reflected and collected directly or via a light beam control member such as a reflector, thereby instantaneously illuminating a subject.

Since a transparent conductive film as trigger electrode 2 is applied to the outer periphery of flashtube 100, however, a part of the flash of emitted light is absorbed by the transparent conductive film. Therefore, there is a problem where the radiation efficiency of the flash of light emitted to a subject decreases.

A strobe device is disclosed where, in order to prevent the radiation efficiency to a subject from decreasing, the luminous efficiency of the flashtube including a transparent conductive film as the trigger electrode is increased (for example, Patent Literature 1).

The strobe device disclosed in Patent Literature 1 is described hereinafter with reference to FIG. 5A and FIG. 5B. FIG. 5A is a front view of a conventional strobe device. FIG. 5B is a side view of the conventional strobe device.

As shown in FIG. 5A and FIG. 5B, flashtube 100 of the conventional strobe device includes an applied transparent conductive film as trigger electrode 2 only on the side of the outer peripheral surface of flashtube 100 where a subject (arrow direction in FIG. 5B) is not directly illuminated. Flashtube 100 includes, on the side where the subject is directly illuminated, non-coated section 9 to which the transparent conductive film is not applied. Flashtube 100 is mounted in the reflector having a cross section of a substantially parabolic shape in the following state:

trigger electrode 2 is disposed on the bottom side opposite to the opening side of the reflector, and the non-coated section 9 side is exposed on the opening side of the reflector.

Thus, a member such as a transparent conductive film as trigger electrode 2 that absorbs emitted light is not disposed on the subject side of flashtube 100. Therefore, the transmission amount of the light to the subject side increases, and the luminous efficiency and radiation efficiency of flashtube 100 can be increased.

In flashtube 100 having the above-mentioned configuration, an ionized region generated in response to a trigger signal applied to trigger electrode 2 is shifted from the shaft center of flashtube 100 to the trigger electrode 2 side. The flash of light emitted from flashtube 100 is reflected while shifting to the bottom side of the reflector. Therefore, the range of the light distribution emitted to the subject becomes narrow.

When flashtube 100 is caused to emit light at a small quantity, the application time of voltage is shortened or the voltage is decreased. The position of the ionized region generated in flashtube 100 therefore fluctuates unstably. As a result, the brightness on the optical axis on the irradiated surface of the subject depends on each light emission.

A specific verification result of the light distribution characteristic is described hereinafter with reference to FIG. 6.

FIG. 6 is a diagram showing the light distribution characteristic of the conventional strobe device. FIG. 6 shows the light distribution characteristic when trigger electrode 2 is disposed on the bottom side of the reflector of flashtube 100. The horizontal axis of FIG. 6 shows angle $\theta$ (refer to FIG. 5B). The solid line of FIG. 6 shows the light distribution characteristic when the flashtube emits light at a maximum quantity, and the broken line shows the light distribution characteristic when the flashtube emits light at a small quantity, $\frac{1}{256}$ of the maximum quantity.

According to FIG. 6, the light distribution characteristic by the light emission at the small quantity is narrower than that by the light emission at the maximum quantity.

Next, dispersion of the light brightness is described hereinafter with reference to FIG. 7. FIG. 7 is a diagram showing the dispersion of the exposure values with respect to the average value of the light emitted from the conventional strobe device. FIG. 7 shows the case where trigger electrode 2 is disposed on the bottom side of the reflector of flashtube 100 and light is emitted over 500 times at a small quantity, $\frac{1}{256}$ of the maximum quantity. In FIG. 7, brightness at a position 1 m separate from flashtube 100 is plotted as the difference from the average value. The horizontal axis shows the number of light emissions.

At this time, the dispersion of the exposure values (EV) of FIG. 7 is calculated as "$3\sigma=0.19EV$" when the standard deviation is denoted as $\sigma$. As a result, it can be judged that light is emitted dispersedly when flashtube 100 is caused to emit light at a small quantity in the strobe device where trigger electrode 2 is disposed on the bottom side of reflector 10 of flashtube 100.

In other words, in flashtube 100 where trigger electrode 2 is disposed on the bottom side of the reflector, there is a problem where the range of the light distribution becomes narrow and the brightness does not become uniform.

CITATION LIST

Patent Literature

PTL 1 Unexamined Japanese Utility Model Publication No. S60-141065

SUMMARY OF THE INVENTION

A strobe device of the present invention includes the following elements:
- a reflector having an opening on the subject side;
- a cylindrical flashtube disposed in the reflector; and
- a first trigger electrode disposed on the outer peripheral surface of the flashtube.

The first trigger electrode is disposed on the subject side of the outer peripheral surface of the flashtube.

Thus, when a trigger signal is applied to the trigger electrode, the ionized region in the flashtube can be shifted from the shaft center to the subject side thereof. As a result, a flash of light emitted from the flashtube is reflected in a large range, from the bottom side to the opening side of the reflector, thereby enabling the range of the light distribution to be enlarged.

A strobe device can be achieved where, even when light is emitted at a small quantity, the range of the light distribution is large and the brightness of emitted light is uniform.

The image pickup device of the present invention is mounted with the strobe device. Thus, the image pickup device can photograph a subject at an appropriate exposure even from a position close to the subject.

DESCRIPTION OF EMBODIMENTS

A strobe device in accordance with an exemplary embodiment of the present invention will be described with reference to the accompanying drawings. Elements similar to those described in BACKGROUND ART are denoted with the same reference marks. The present invention is not limited to the present exemplary embodiment.

Exemplary Embodiment

FIG. 1A through FIG. 1F are sectional views showing first through sixth configurations of a flashtube in the strobe device in accordance with the exemplary embodiment of the present invention.

As shown in FIG. 1A through FIG. 1F, the strobe device of the present exemplary embodiment takes various layouts of a first trigger electrode and second trigger electrode on flashtube 1. Each of the trigger electrodes is formed of a transparent conductive film or the like. The strobe device of the present exemplary embodiment includes a driver circuit similar to that described using FIG. 4, and controls the light emission from the flashtube or the like. The first trigger electrode and second trigger electrode are sometimes collectively called trigger electrodes.

The strobe device of the present exemplary embodiment includes a driver circuit and a flashtube having at least a first trigger electrode, and instantaneously causes flashtube 1 to emit light in response to the voltage applied from the driver circuit to the trigger electrode.

First, the first configuration of the flashtube in the strobe device of the present exemplary embodiment is hereinafter described using FIG. 1A.

Figure 1A:
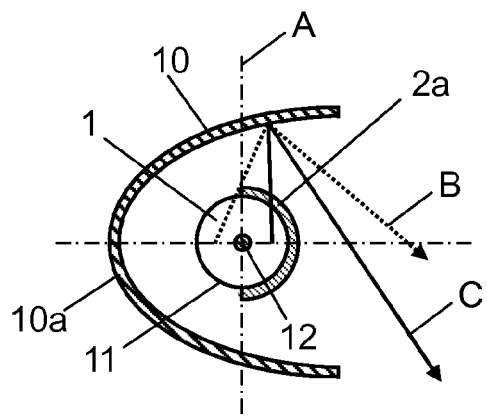
FIG. 1A is a sectional view showing a first configuration of a flashtube in a strobe device in accordance with an exemplary embodiment of the present invention.

As shown in FIG. 1A, the strobe device of the present exemplary embodiment includes reflector 10 having at least an opening, flashtube 1 having a cylindrical shape or the like disposed near the focal point in the reflector, and a driver circuit (not shown). Reflector 10 has a cross section of a substantially parabolic shape (including a parabolic shape), and emits a flash of light toward a subject (not shown, but exists in the right direction in FIG. 1A).

Flashtube 1 includes first trigger electrode 2a disposed on the outer periphery, main electrode 12 extending from the inside out of both ends surfaces, and rare gas such as xenon filled in flashtube 1. First trigger electrode 2a is formed of a transparent conductive film made of ITO or $SnO_2$, for example. First trigger electrode 2a is disposed on the opening side (subject side) of reflector 10 over a substantially entire length of the longitudinal direction of cylindrical flashtube 1 and substantially a half (including just a half) of the outer periphery. Non-electrode section 11 having no first trigger electrode 2a is disposed on the side of flashtube 1 facing bottom 10a (farthest from the opening) of reflector 10.

Figure 4:
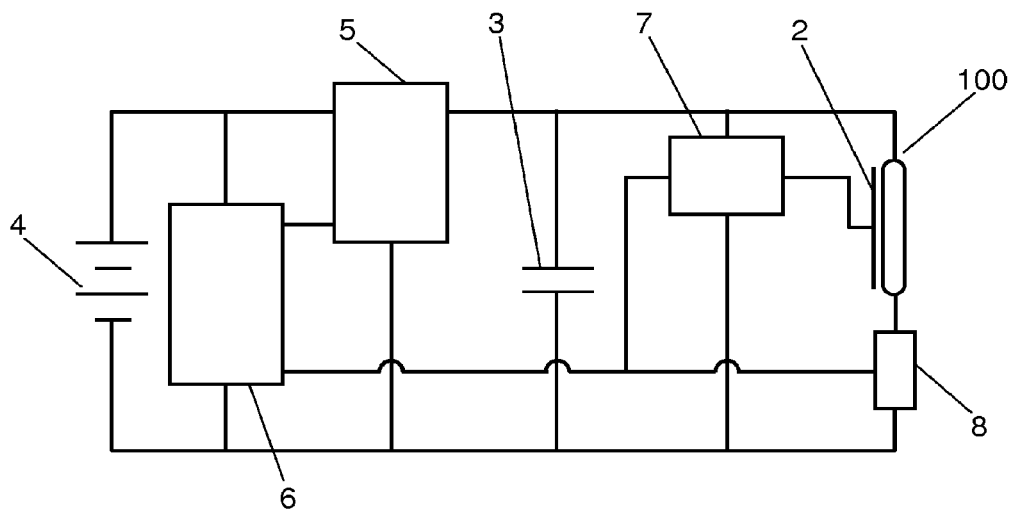
FIG. 4 is a circuit diagram showing an example of a circuit included in the strobe device.
Figure 5A:
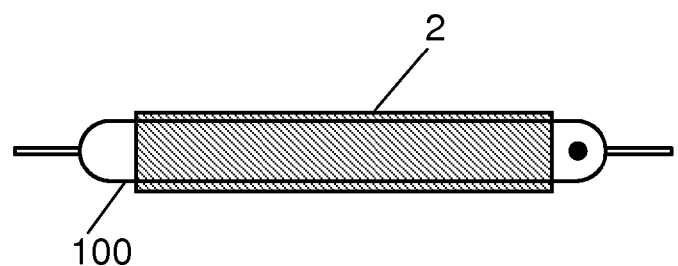
FIG. 5A is a front view of a conventional strobe device.
Figure 5B:
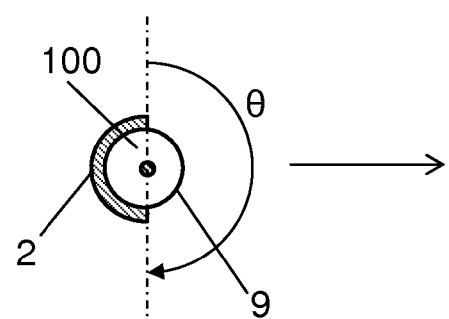
FIG. 5B is a side view of the conventional strobe device.
Figure 6:
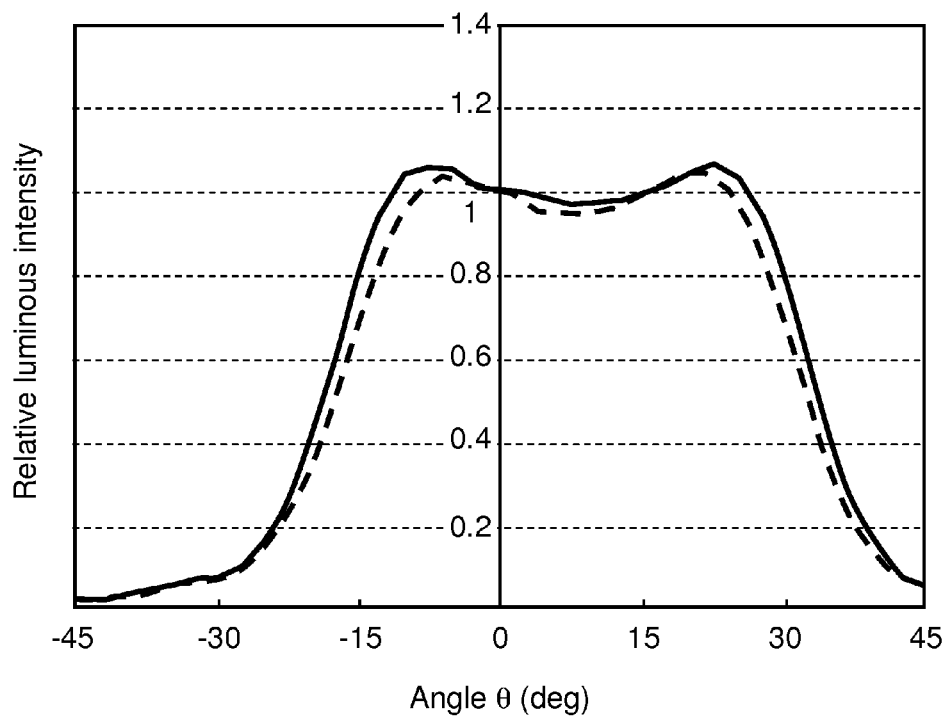
FIG. 6 is a diagram showing the light distribution characteristic of the conventional strobe device.

When voltage is applied from trigger circuit 7 of the driver circuit of FIG. 4 to first trigger electrode 2a of the strobe device having this configuration, the ionized region in flashtube 1 is formed in a state where the region is shifted from main electrode 12 as the shaft center to the subject side having first trigger electrode 2a. Therefore, a flash of light emitted from flashtube 1 is reflected in a larger range, from the bottom 10a side to the opening side in reflector 10, than in the case where the ionized region is formed on the bottom 10a side of reflector 10. In other words, as shown in FIG. 1A, light C emitted from the ionized region on the subject side is distributed in a larger range than light B emitted from the ionized region on the bottom 10a side when the lights are reflected from the same position of reflector 10. As a result, the range of the flash of light emitted from flashtube 1 of the strobe device can be enlarged.

In the strobe device of the present exemplary embodiment, when the energy (voltage) applied to first trigger electrode 2a is simply decreased in order to cause flashtube 1 to emit light at a small quantity, first trigger electrode 2a disposed on the subject side disturbs light emission of an intended small quantity. Therefore, the energy (voltage) of the trigger signal applied to first trigger electrode 2a is required to be increased.

Thus, in order to emit light at a small quantity, trigger circuit 7 of the driver circuit extends the time period over which the trigger signal is applied to first trigger electrode 2a, or increases the voltage of the trigger signal. Thus, the position of the ionized region generated in flashtube 1 can be stabilized, and light emission at a uniform brightness or light emission at the intended small quantity can be achieved.

The light distribution characteristic of the strobe device of the present exemplary embodiment is described hereinafter with reference to FIG. 2.

Figure 2:
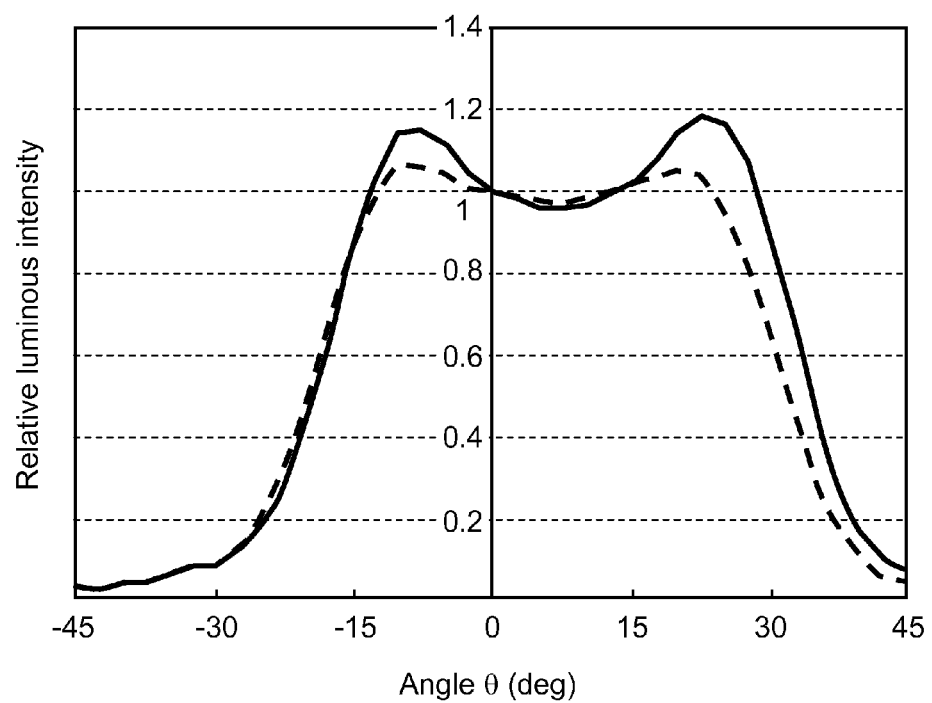
FIG. 2 is a diagram showing the light distribution characteristic of the strobe device in accordance with the exemplary embodiment.

FIG. 2 is a diagram showing the light distribution characteristic of the strobe device in accordance with the present exemplary embodiment. FIG. 2 shows the light distribution characteristic of the strobe device while the horizontal axis shows angle θ of emitted light and the vertical axis shows relative luminous intensity (brightness). In other words, FIG. 2 shows relative luminous intensity when the luminous intensity of the optical axis direction is normalized to one. The solid line of FIG. 2 shows the light distribution characteristic when the strobe device emits light at a small quantity, 1/256 of the maximum quantity. The broken line of FIG. 2 shows the light distribution characteristic when the strobe device emits light at a maximum quantity.

According to FIG. 2, the range (angle) of the light distribution when light is emitted at the small quantity is larger than that when light is emitted at the maximum quantity in the strobe device of the present exemplary embodiment. That is considered to be because the ionized region at the small quantity is closer to the subject side than the ionized region at the maximum quantity.

Next, dispersion of the exposure values (EV) with respect to the average value in the strobe device of the present exemplary embodiment is described with reference to FIG. 3.

Figure 3:
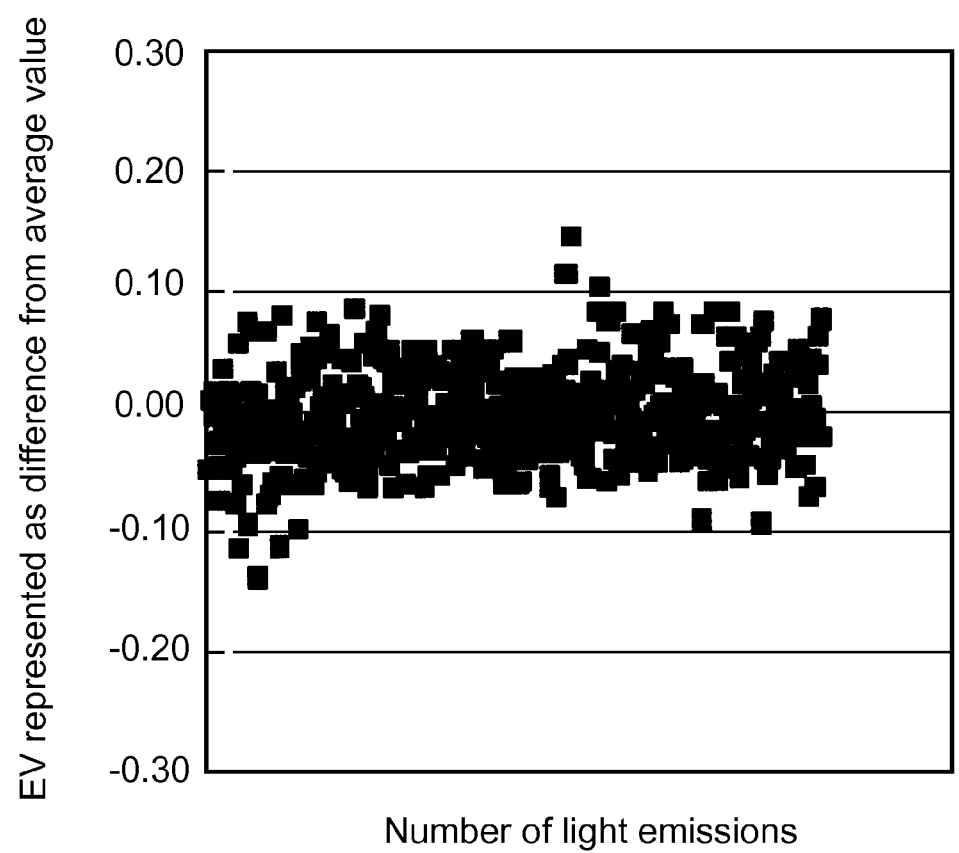
FIG. 3 is a diagram showing dispersion of the exposure value with respect to the average value of the light emitted by the strobe device in accordance with the exemplary embodiment.

FIG. 3 is a diagram showing dispersion of the exposure values with respect to the average value of the light emitted by the strobe device in accordance with the present exemplary embodiment.

In FIG. 3, exposure values EV at a position 1-m separate from flashtube 1 are plotted as the differences from the average value of them in the case where the strobe device emits light over 500 times at a small quantity, 1/256 of the maximum quantity. The horizontal axis shows the number of light emissions.

At this time, the dispersion of exposure values EV of FIG. 3 is calculated as "3σ=0.14EV" when the standard deviation is denoted as σ.

Figure 7:
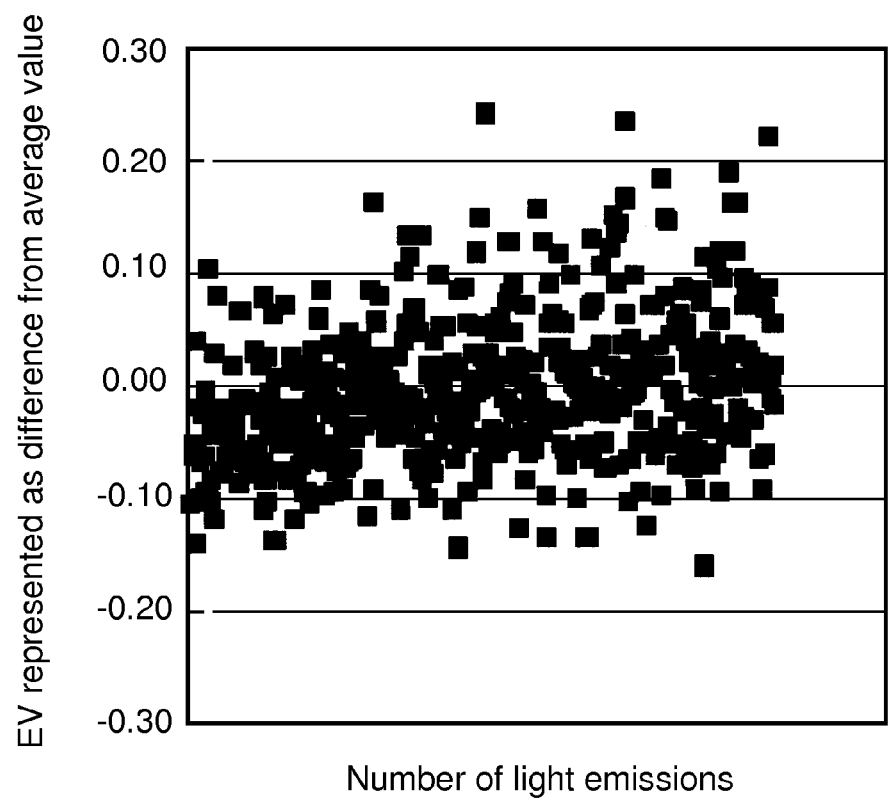
FIG. 7 is a diagram showing the dispersion of the exposure value with respect to the average value of the light emitted by the conventional strobe device.

As discussed above, the dispersion of exposure values EV is calculated as "3σ=0.19EV" in the conventional strobe device of FIG. 7.

In other words, the strobe device of the present exemplary embodiment, even in light emission at a small light quantity, can reduce the dispersion of exposure values EV comparing with the conventional case where the trigger electrode is disposed on the bottom 10a side of reflector 10 of flashtube 1.

As a result, the strobe device of the present exemplary embodiment can emit light at a uniform brightness.

The second through sixth configurations of flashtube 1 in the strobe device of the present exemplary embodiment are described with reference to FIG. 1B through FIG. 1F.

Figure 1B:
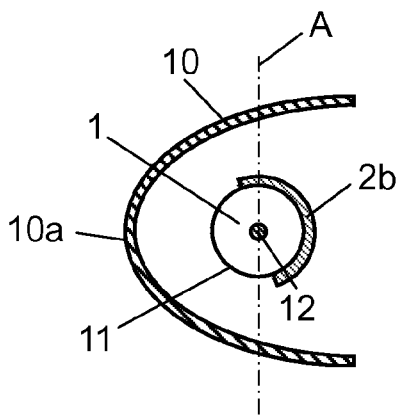
FIG. 1B is a sectional view showing a second configuration of the flashtube in the strobe device in accordance with the exemplary embodiment of the present invention.

First, FIG. 1B is a sectional view showing the second configuration of the flashtube in the strobe device in accordance with the exemplary embodiment of the present invention.

In flashtube 1 of the second configuration shown in FIG. 1B, first trigger electrode 2b covering substantially a half (including just a half) of the outer periphery, which has been shown in the first configuration of FIG. 1A, is disposed on the subject side at the following position:

first trigger electrode 2b is rotated in the peripheral direction of flashtube 1 by about 40° (exceeding 0°), for example, to the bottom 10a side of reflector 10 (beyond chain line A). Non-electrode section 11 is formed at the position where non-electrode section 11 of the first configuration is rotated in the peripheral direction to the opening side of reflector 10. In FIG. 1B, first trigger electrode 2b is rotated counterclockwise. However, first trigger electrode 2b may be rotated clockwise. Thus, the ionized region in flashtube 1 can be shifted from main electrode 12 as the shaft center of flashtube 1 to the subject side, and the range of the light distribution can be enlarged.

Figure 1C:
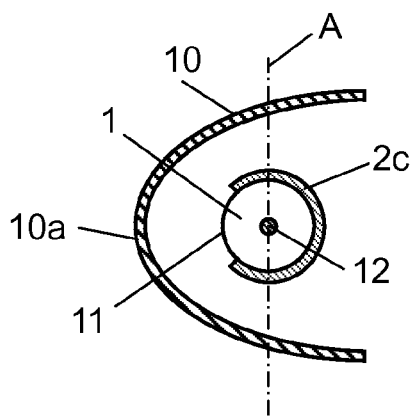
FIG. 1C is a sectional view showing a third configuration of the flashtube in the strobe device in accordance with the exemplary embodiment of the present invention.

FIG. 1C is a sectional view showing the third configuration of the flashtube in the strobe device in accordance with the exemplary embodiment of the present invention.

In flashtube 1 of the third configuration shown in FIG. 1C, first trigger electrode 2c is disposed on the subject side in a reverse C shape covering about 270°, for example, in the peripheral direction of flashtube 1. At this time, first trigger electrode 2c extends to the bottom 10a side of reflector 10 beyond chain line A from the up and down parts (on chain line A) of the outer periphery of flashtube 1. Non-electrode section 11 is formed in a band shape or the like that faces bottom 10a of reflector 10 of flashtube 1. Thus, the ionized region in flashtube 1 can be shifted from main electrode 12 as the shaft center of flashtube 1 to the subject side, and the range of the light distribution can be enlarged.

Figure 1D:
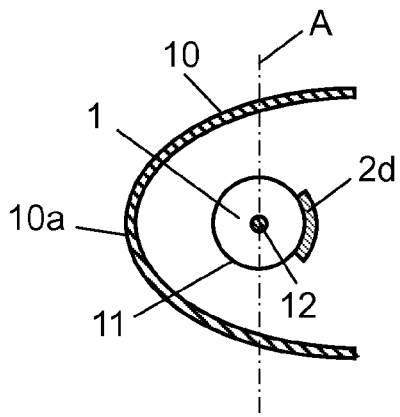
FIG. 1D is a sectional view showing a fourth configuration of the flashtube in the strobe device in accordance with the exemplary embodiment of the present invention.

FIG. 1D is a sectional view showing the fourth configuration of the flashtube in the strobe device in accordance with the exemplary embodiment of the present invention.

In flashtube 1 of the fourth configuration shown in FIG. 1D, first trigger electrode 2d is disposed on the subject side in a one-band shape covering 30° or more and 180° or less, for example, on the center of the side surface of the outer periphery of flashtube 1. Non-electrode section 11 is formed in a C shape or the like extending from the bottom side to the subject side of flashtube 1. Thus, the ionized region in flashtube 1 can be shifted from main electrode 12 as the shaft center of flashtube 1 to the subject side, and the range of the light distribution can be enlarged.

Figure 1E:
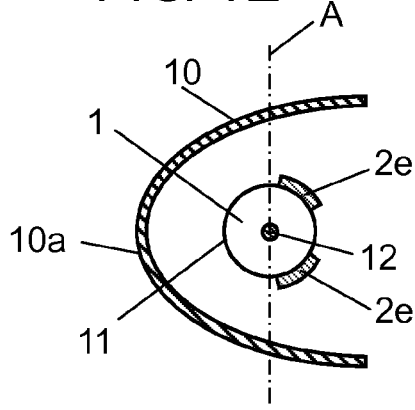
FIG. 1E is a sectional view showing a fifth configuration of the flashtube in the strobe device in accordance with the exemplary embodiment of the present invention.

FIG. 1E is a sectional view showing the fifth configuration of the flashtube in the strobe device in accordance with the exemplary embodiment of the present invention.

In flashtube 1 of the fifth configuration shown in FIG. 1E, two first trigger electrodes 2e are disposed in two band shapes, for example, on the subject side in the longitudinal direction of flashtube 1 (direction vertical to the paper surface of FIG. 1E). Non-electrode sections 11 are formed in band shapes between two first trigger electrodes 2e and on the outer periphery of flashtube 1 on the bottom 10a side of reflector 10, respectively. The number of first trigger electrodes 2e is two in FIG. 1E, but may be three or more. Thus, the ionized region in flashtube 1 can be shifted from main electrode 12 as the shaft center of flashtube 1 to the subject side, and the range of the light distribution can be enlarged.

Figure 1F:
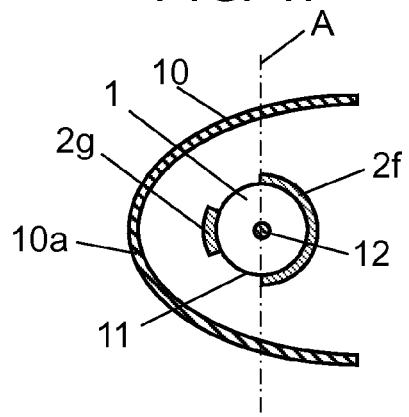
FIG. 1F is a sectional view showing a sixth configuration of the flashtube in the strobe device in accordance with the exemplary embodiment of the present invention.

FIG. 1F is a sectional view showing the sixth configuration of the flashtube in the strobe device in accordance with the exemplary embodiment of the present invention.

In flashtube 1 of the sixth configuration shown in FIG. 1F, first trigger electrode 2f is disposed on the opening (subject) side of reflector 10 over a substantially entire length of the longitudinal direction of cylindrical flashtube 1 and substantially a half (including just a half) of the outer periphery thereof. One second trigger electrode 2g, for example, is also disposed on the outer periphery of flashtube 1 facing bottom 10a of reflector 10. In other words, second trigger electrode 2g having an area narrower than that of first trigger electrode 2f on the subject side is disposed on the outer periphery of flashtube 1 on the bottom side opposite to the opening side of reflector 10. Two non-electrode sections 11 are formed between first trigger electrode 2f and second trigger electrode 2g on the bottom 10a side of reflector 10 of flashtube 1. One second trigger electrode 2g is disposed in FIG. 1F, but two or more second trigger electrodes 2g may be disposed on the bottom 10a side of reflector 10 and three or more non-electrode sections 11 may be disposed. Any configuration may be employed as long as the area of second trigger electrodes 2g is narrower than that of first trigger electrode 2f and second trigger electrodes 2g do not affect the action of first trigger electrode 2f. Thus, the ionized region in flashtube 1 can be shifted from main electrode 12 as the shaft center of flashtube 1 to the subject side, and the range of the light distribution can be enlarged.

The flashtubes having the second through sixth configurations of present exemplary embodiment discussed above can achieve the same action and effect as those of the flashtube having the first configuration discussed using FIG. 1A. In other words, when voltage is applied from trigger circuit 7 of the driver circuit as shown in FIG. 4, the ionized region in flashtube 1 is formed in a state where the region is shifted from main electrode 12 as the shaft center to the subject side having first trigger electrodes 2a through 2f. A flash of light emitted from flashtube 1 is reflected in a larger range, from the bottom 10a side to the opening side in reflector 10, comparing with the case where the ionized region is formed on the bottom 10a side of reflector 10. As a result, the range of the light distribution of the flash of light emitted from flashtube 1 of the strobe device can be enlarged as discussed using FIG. 2.

Similarly to the flashtube having the first configuration, light can be emitted at a small quantity by extending the time period over which the trigger signal is applied to the first trigger electrode or increasing the voltage of the trigger signal. Thus, the position of the ionized region generated in flashtube 1 can be stabilized, and light emission at a uniform brightness or light emission at an intended small quantity can be achieved, as discussed using FIG. 3.

The present invention is not limited to the present exemplary embodiment, but may be modified variously. For example, as shown in FIG. 1F, the following configuration may be employed:
 a plurality of band-like first trigger electrodes 2e is disposed on the subject side and one band-like second trigger electrode 2g is disposed on the bottom 10a side of reflector 10.
The following configuration may be also employed:
 a first trigger electrode having a substantially parabolic shape disposed on the subject side is divided into three or more, and a plurality of band-like non-electrode sections 11 is formed between the first trigger electrodes.

In this case, a plurality of trigger circuits 7 may be disposed in the driver circuit of FIG. 4, and may simultaneously apply trigger signals to all of the first trigger electrodes and second trigger electrodes to drive them. Trigger signals may be applied only to one specific trigger electrode or to a plurality of first trigger electrodes and second trigger electrodes to drive them.

In the present exemplary embodiment, the first trigger electrode and second trigger electrode are formed of transparent conductive films. However, the present invention is not limited to this. The trigger electrodes may be made of a metal material such as aluminum, gold, silver, or copper, or an alloy material of them. Thus, low-resistance, uniform, and thick first and second trigger electrodes, for example, can be easily formed using an evaporation method.

In the present exemplary embodiment, the reflector has a cross section of a substantially parabolic shape. However, the present invention is not limited to this. The cross section may have any light distribution shape such as a polygonal shape or peripheral shape as long as a flash of light emitted from the flashtube arrives at a subject through the opening.

The strobe device of the present invention includes the following elements:
 a reflector having an opening on the subject side;
 a flashtube disposed in the reflector; and
 a first trigger electrode disposed on the outer peripheral surface of the flashtube.
The first trigger electrode is disposed on the subject side of the outer peripheral surface of the flashtube.

Thus, when a trigger signal is applied to the first trigger electrode, the ionized region in the flashtube can be shifted from the shaft center to the subject side thereof. As a result, a flash of light emitted from the flashtube is reflected in a large range, from the bottom side to the opening side of the reflector, thereby enabling a strobe device having a large range of light distribution to be achieved.

In a strobe device of the present invention, the first trigger electrode is formed of a transparent conductive film. Thus, the subject can be irradiated with the light reflected by the reflector and direct light having passed through the first trigger electrode.

In a strobe device of the present invention, the first trigger electrode is disposed so as to cover at least a half of the outer peripheral surface of the flashtube. Thus, local stress of the flashtube is prevented from occurring when trigger signals are applied to a plurality of slender first trigger electrodes, thereby enabling a strobe device having a high reliability to be achieved.

In a strobe device of the present invention, a plurality of first trigger electrodes are disposed on the outer peripheral surface of the flashtube. Thus, absorption of a flash of light by the first trigger electrodes can be reduced, and the flash of light emitted from the flashtube can be directly radiated to the subject side from between the first trigger electrodes. As a result, when the same driving power is employed, the light quantity emitted to the subject can be increased. When the light quantity is the same, the energy consumption can be reduced by decreasing the driving power.

In a strobe device of the present invention, a second trigger electrode having an area smaller than that of the first trigger electrode on the subject side is disposed on the outer periphery of the flashtube on the bottom side opposite to the opening side of the reflector. Thus, a strobe device can be achieved where the ionized region in the flashtube is shifted to the subject side, the range of the light distribution is enlarged, and light is emitted at a uniform brightness.

Industrial Applicability

The strobe device of the present invention can be effectively used for an image pickup device or the like constituting a digital still camera.

Reference Marks in the Drawings 1 flashtube
2 trigger electrode
2a, 2b, 2c, 2d, 2e, 2f first trigger electrode 2g second trigger electrode
3 storage element
4 battery power supply boost converter circuit
6 control section
7 trigger circuit
8 switch circuit
9 non-coated section reflector
10a bottom
11 non-electrode section
12 main electrode

The invention claimed is:

1. A strobe device comprising:
   a reflector having an opening on a subject side;
   a flashtube disposed in the reflector; and
   a first trigger electrode disposed on an outer peripheral surface of the flashtube, the first trigger electrode is disposed on the subject side of the outer peripheral surface of the flashtube, and the first trigger electrode includes a transparent conductive film, wherein the flashtube emits light at a large quantity and at a small quantity smaller than the large quantity, and
   when the flashtube emits light at the small quantity, the trigger circuit extends a time period over which a trigger signal is applied to the first trigger electrode or the trigger circuit increases a voltage of the trigger signal.

2. The strobe device of claim 1, wherein
   the first trigger electrode is disposed so as to cover at least a half of the outer peripheral surface of the flashtube.

3. The strobe device of claim 2, wherein
   a second trigger electrode having an area smaller than an area of the first trigger electrode on the subject side is disposed on an outer periphery of the flashtube on a bottom side opposite to the opening side of the reflector.

4. The strobe device of claim 1, wherein
   a plurality of first trigger electrodes are disposed on the outer peripheral surface of the flashtube.

5. The strobe device of claim 4, wherein
   a second trigger electrode having an area smaller than an area of the first trigger electrode on the subject side is disposed on an outer periphery of the flashtube on a bottom side opposite to the opening side of the reflector.

6. The strobe device of claim 1, wherein
   a second trigger electrode having an area smaller than an area of the first trigger electrode on the subject side is disposed on an outer periphery of the flashtube on a bottom side opposite to the opening side of the reflector.

7. An image pickup device comprising the strobe device of claim 1.

8. The strobe device of claim 1, wherein
   a second trigger electrode having an area smaller than an area of the first trigger electrode on the subject side is disposed on an outer periphery of the flashtube on a bottom side opposite to the opening side of the reflector.

9. The strobe device of claim 1 further comprising a main electrode as a shaft center of the flashtube, wherein an ionized region in the flashtube is formed in a state where the region is shifted from the shaft center to the subject side.

10. The strobe device of claim 1, wherein the reflector has a cross section of a substantially parabolic shape, and the flashtube having a cylindrical shape is disposed near the focal point in the reflector.

11. The strobe device of claim 10 further comprising a main electrode as a shaft center of the flashtube, wherein an ionized region in the flashtube is formed in a state where the region is shifted from the shaft center to the subject side.

12. The strobe device of claim 1 further comprising a main electrode as a shaft center of the flashtube, wherein an ionized region in the flashtube is formed in a state where the region is shifted from the shaft center to the subject side.

13. The strobe device of claim 1, wherein the light emitted at the small quantity is 1/256 of the light emitted at the large quantity.

* * * * *